United States Patent [19]

Davis

[11] Patent Number: 5,461,680
[45] Date of Patent: Oct. 24, 1995

[54] METHOD AND APPARATUS FOR CONVERTING IMAGE DATA BETWEEN BIT-PLANE AND MULTI-BIT PIXEL DATA FORMATS

[75] Inventor: Hedley Davis, Freemont, Calif.

[73] Assignee: Escom AG, Heppenheim, Germany

[21] Appl. No.: 96,461

[22] Filed: Jul. 23, 1993

[51] Int. Cl.$^6$ .................. G06F 3/00; G06F 5/00
[52] U.S. Cl. .................. 382/276; 345/98; 345/153
[58] Field of Search .................. 382/1, 41; 348/453, 348/488, 577, 717; 345/98, 153, 200; 358/523; 395/131; H04N 1/41

[56] References Cited

U.S. PATENT DOCUMENTS

| | | | |
|---|---|---|---|
| 4,783,652 | 11/1988 | Lumelsky | 345/132 |
| 4,845,488 | 7/1989 | Kelly | 345/201 |
| 4,852,065 | 7/1989 | Baddiley | 365/221 |
| 4,885,576 | 12/1989 | Pennebaker et al. | 382/56 |
| 4,967,378 | 10/1990 | Rupel et al. | 395/131 |
| 5,251,298 | 10/1993 | Nally | 395/131 |
| 5,253,308 | 10/1993 | Johnson | 382/41 |
| 5,270,696 | 12/1993 | Shin et al. | 345/98 |

OTHER PUBLICATIONS

W. M. Newman & R. F. Sproull, "Raster Display Hardware", *Principles of Interactive Computer Graphics*, Second Edition, pp. 275–281 (1979).

"Amiga Hardware Reference Manual", *Addison–Wesley Publishing Company, Inc.*, pp. 33–61 (1989).

*Primary Examiner*—Leo H. Boudreau
*Assistant Examiner*—Chris Kelley
*Attorney, Agent, or Firm*—Ratner & Prestia

[57] ABSTRACT

A circuit which transforms image data between bit-plane data representations and multi-bit pixel representations includes a plurality of sequential logic elements arranged as a matrix having columns and rows. Data values representing bit-plane data are stored into the columns of the matrix according to a first scheme and data values representing multi-bit pixel data are stored into the columns of the matrix according to a second scheme. Data applied to the columns of the matrix is shifted along the rows until the matrix is filled. The converted data is then read out along the rows of the matrix.

7 Claims, 4 Drawing Sheets

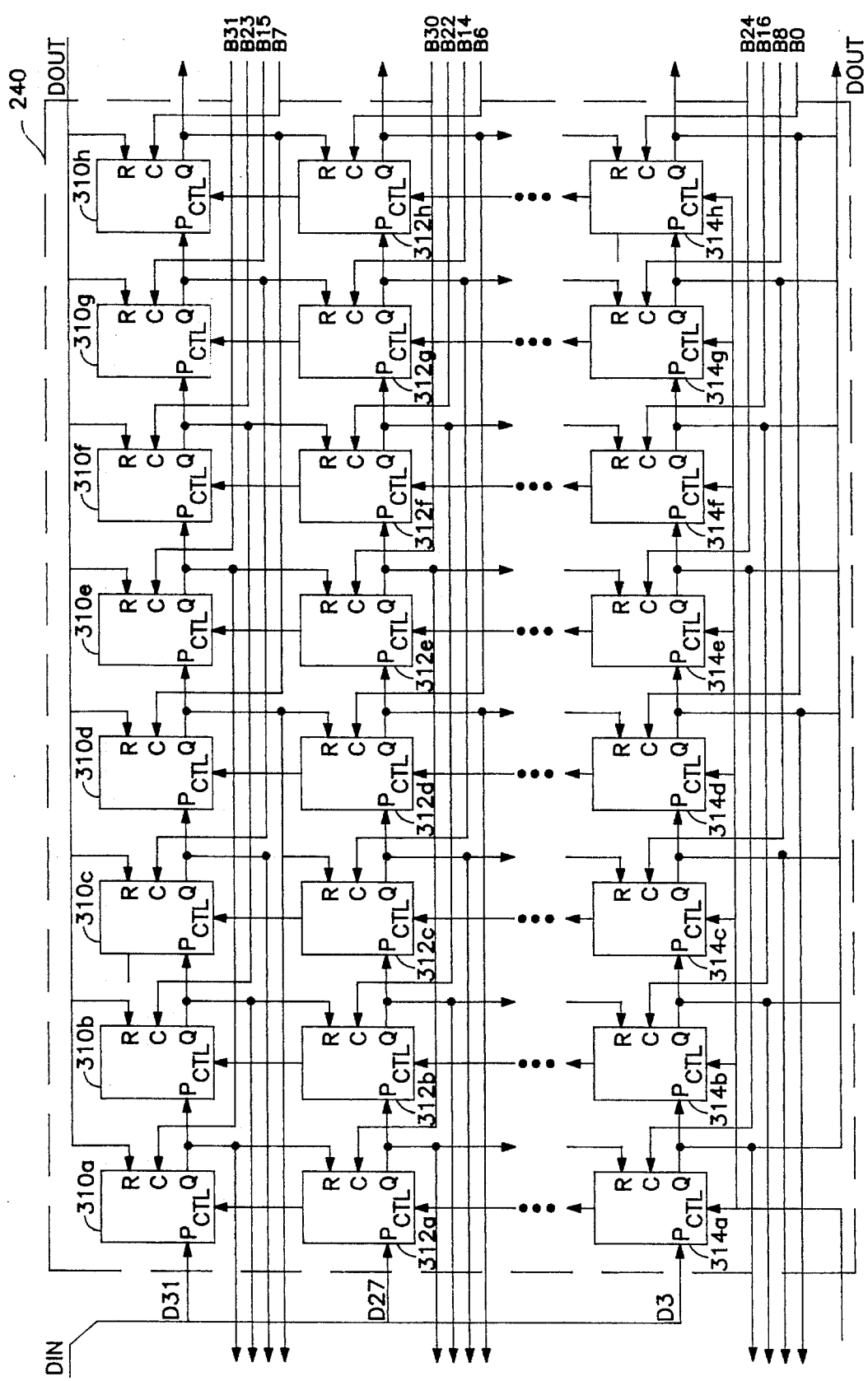

METHOD AND APPARATUS FOR CONVERTING IMAGE DATA BETWEEN BIT-PLANE AND MULTI-BIT PIXEL DATA FORMATS

BACKGROUND OF THE INVENTION

The present invention concerns video image processing apparatus and in particular apparatus for converting image data between bit-plane and multi-bit pixel image representations.

Video data can be organized in a computer memory in a variety of formats. For each picture element (pixel) on the screen, there are usually several bits which together describe the properties of the pixel. These properties may be the color of the pixel, its brightness, or any of a number of other properties. The two most common formats for representing an image by digital values are bit-plane and multi-bit pixel. Each of these formats has advantages and disadvantages.

In the bit-plane format, a group of pixels is represented as a series of planes. Each plane contains one bit per pixel. Thus for an N-bit representation of image data, N planes of data are employed. The total memory storage needed to represent the image is the number of pixels in the image times the number of planes of data.

Bit-plane representation of the images is advantageous since it only uses the amount of data needed by the bit-planes which represent the image. For example, a monochrome image having no gray scale variations, such as may be used by a word processing program, can be represented by a single bit-plane. In addition, an image stored in bit-plane format may be modified by changing only a single plane or some set of planes without affecting the other planes. If, for example, the image includes foreground components on one set of bit-planes and background components on another set of bit-planes, the background bit-planes could be manipulated without affecting the foreground bit-planes.

Bit-plane image representation has its disadvantages as well. For example, to set a specific pixel to a specific color, all of the bits used to represent the pixel may need to be modified. This usually requires N different memory accesses for an image represented by N planes of data.

In the multi-bit pixel format each image pixel is typically represented by an eight bit byte. All bits in the byte are addressed by a single unique address value. Thus, for eight-bit pixel values, the amount of memory needed for any image is always eight-bits times the number of pixels in the image.

The multi-bit pixel format for representing images has many advantages. To set a specific pixel to a specific color, only a single memory location would need to be modified. Furthermore, in image processing it is often desirable to perform mathematical operations on the image pixels. These operations may be performed for such functions as spatial filtering, edge detection or pattern matching. The multi-bit pixel representation is a good format for these operations because each of the image pixels is represented by a number which may be conveniently manipulated by the computer.

The multi-bit pixel format has disadvantages as well. This format may require more memory than the bit-plane format to represent a given image. In addition, for certain types of image operations, such as the management of overlays, this format may require more data to be transferred and processed than if the equivalent operation were performed on a bit-plane representation of the image.

SUMMARY OF THE INVENTION

The present invention is embodied in circuitry which transforms image data between bit-plane data representations and multi-bit pixel representations. The circuitry includes a plurality of sequential local elements arranged as a matrix having columns and rows. Data may be input to the matrix along its columns. Data applied to the columns of the matrix is shifted along the rows until the matrix is filled. This data is then read out along the rows of the matrix.

BRIEF DESCRIPTION OF THE DRAWING

FIG. 3 is a block diagram of an eight-by-eight switch suitable for use in the converter shown in FIG. 2.

DETAILED DESCRIPTION

Figure 1:
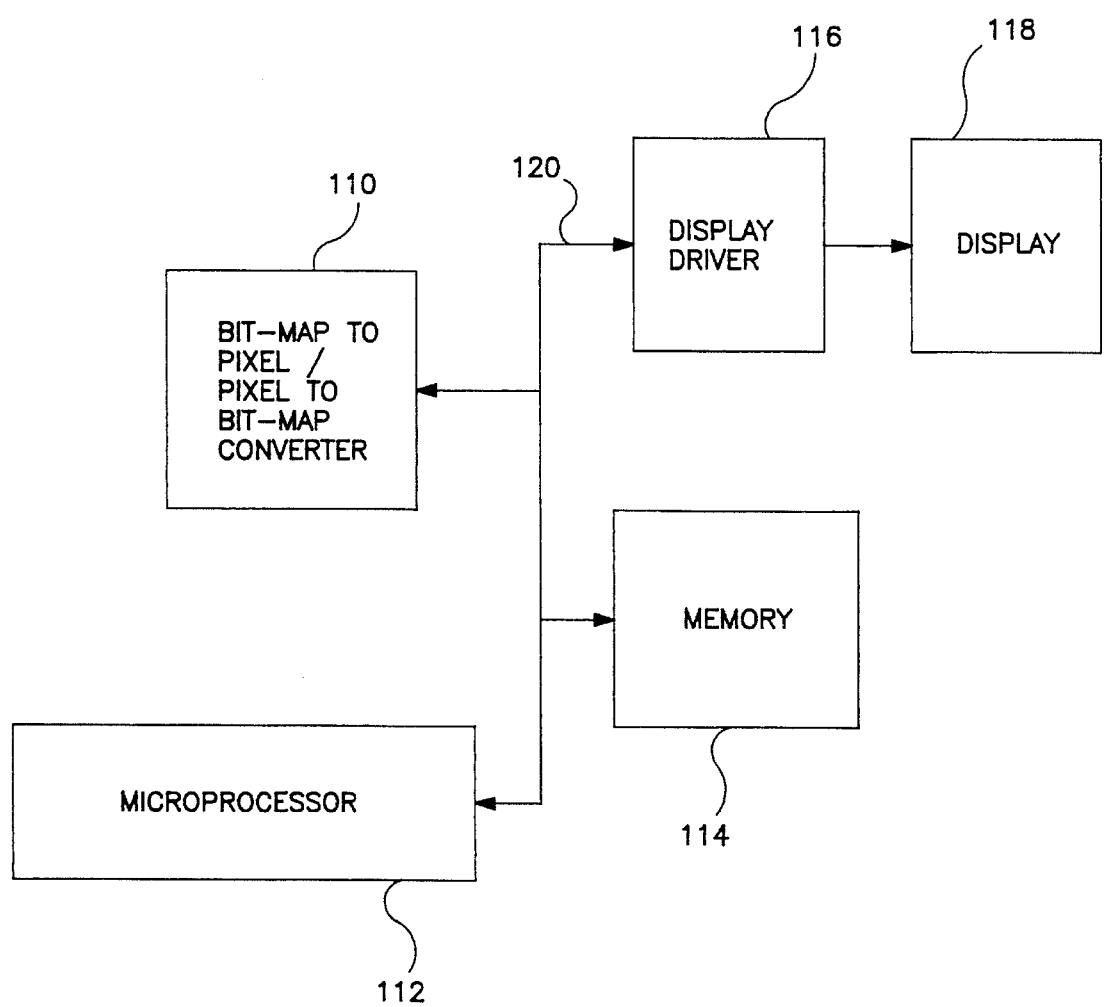
FIG. 1 is a block diagram of a video display system which includes an embodiment of the present invention.

FIG. 1 is a block diagram of an image processing system which includes a bit-plane to pixel/pixel to bit-plane converter in accordance with the present invention. The converter 110 is coupled to a system bus 120 which is also coupled to a display driver 116, a memory 114, and a microprocessor 112. The display driver 116 generates electrical signals which cause a display device 118 to reproduce an image represented by data values held in memory 114. The microprocessor 112 controls the operation of the image processing circuitry shown in FIG. 1.

In the exemplary embodiment of the invention, the memory 114 holds both bit-plane and multi-bit pixel data structures (e.g. frame buffers) which represent images that may be displayed on the display device 118. The display driver 116 used in this embodiment of the invention, however, only displays images in bit-plane format.

As described above, certain operations which are performed on the image data such as spatial filtering and pattern matching are more efficiently performed when the image is represented by multi-bit pixel data than by bit-plane data. Accordingly, it is desirable to be able to convert between bit-plane and multi-bit pixel representations of a given image to process the image data and then to convert from multi-bit pixel format to bit-plane format to display the image. It is also desirable that this conversion occur with as little involvement of the microprocessor 112 as possible. The bit-plane to pixel/pixel to bit-plane converter 110 was designed to meet these goals.

In the exemplary embodiment of the invention, the input and output ports of the converter 110 are memory mapped. That is to say, the microprocessor sends data to the converter 110 by writing to specific memory locations and it receives data which has been processed by the converter 110 by reading from specific memory locations. The actual data conversion operation as seen by the microprocessor 112 involves memory to memory moves of data values in the memory 114 to the memory mapped input locations in the converter 110 and then from memory mapped locations in the converter 110 to other locations in the memory 114.

Figure 1A:
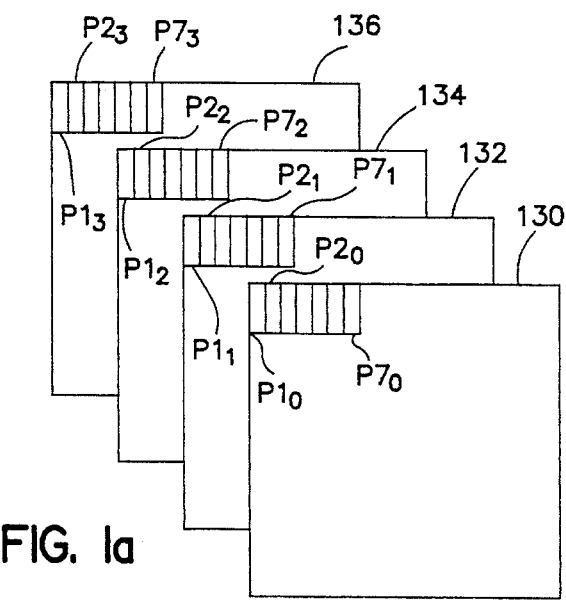
FIG. 1a is a diagram of data structures which illustrate bit-plane image representation.
Figure 1B:
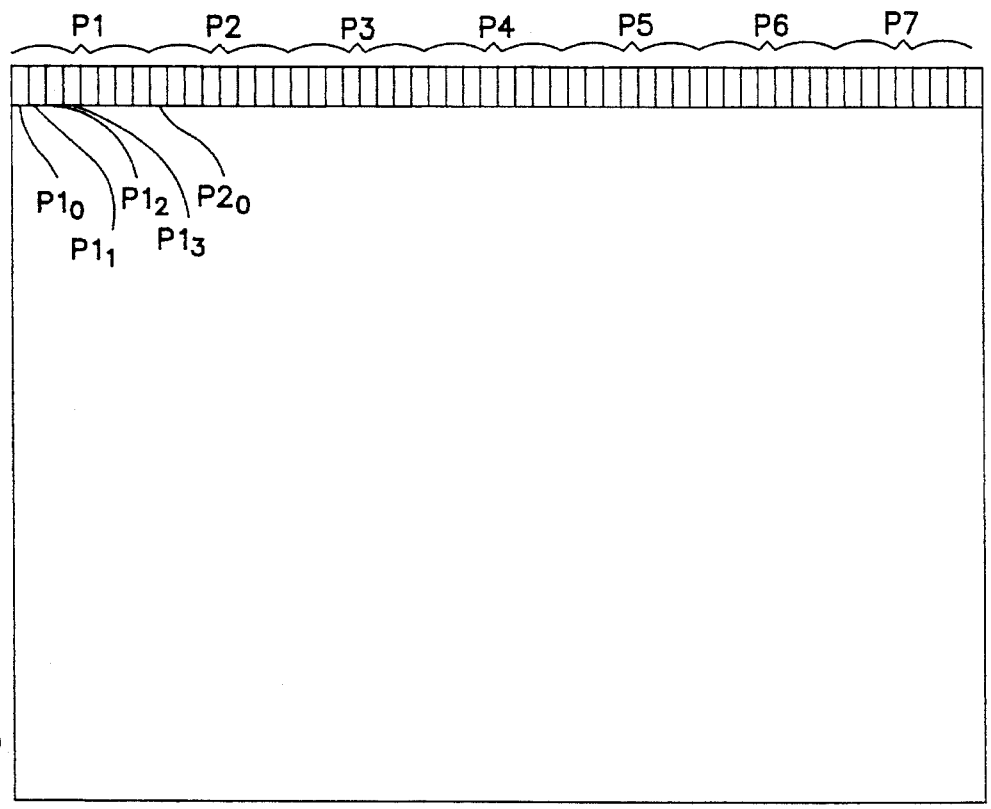
FIG. 1b is a diagram of a data structure which illustrates multi-bit pixel data representation.

FIGS. 1a and 1b represent images in bit-plane and multi-bit pixel format respectively. In FIG. 1a, four different data structures in four respectively different memory locations are used to represent a single image. Pixel P1 is represented by one bit from each of these data structures: $P1_0$ from area 130, $P1_1$ from area 132, $P1_2$ from area 134, and $P1_3$ from area 136. Assigning a specific color to pixel P1 would typically require that each of these bits be accessed, an operation which would require four memory read operations (to ensure that the adjoining pixels in the memory word are not affected) followed by four memory write operations. FIG. 1a shows seven pixels in the bit-plane format of which three, P1, P2, and P7, are identified.

FIG. 1b shows how the seven image pixels may be represented in multi-bit pixel format. In FIG. 1b the bits which represent pixel P1 are contiguous and addressed by a single address value. Thus the operation of changing pixel P1 to a specific color would require only one memory write operation if individual image pixels may be accessed directly in the memory or a read operation followed by a write operation if each memory word may hold several pixel values.

In order to convert from a bit-plane representation to a multi-bit pixel representation, memory words containing the individual bits which describe a given pixel are stored in a matrix of memory locations in one direction and then retrieved the matrix of memory location in an orthogonal direction.

As shown in FIGS. 1a and 1b, the bit-plane format may use fewer bits than the multi-bit pixel format. Where, for example, an image is represented in five bit-planes and that same image is to be translated into multi-bit pixel format having eight-bit pixels, three padding bits, for example logic zeros, may be added to each pixel to complete the conversion process. This padding effectively adds three zero-valued bit-planes to the image prior to translation.

Figure 2:
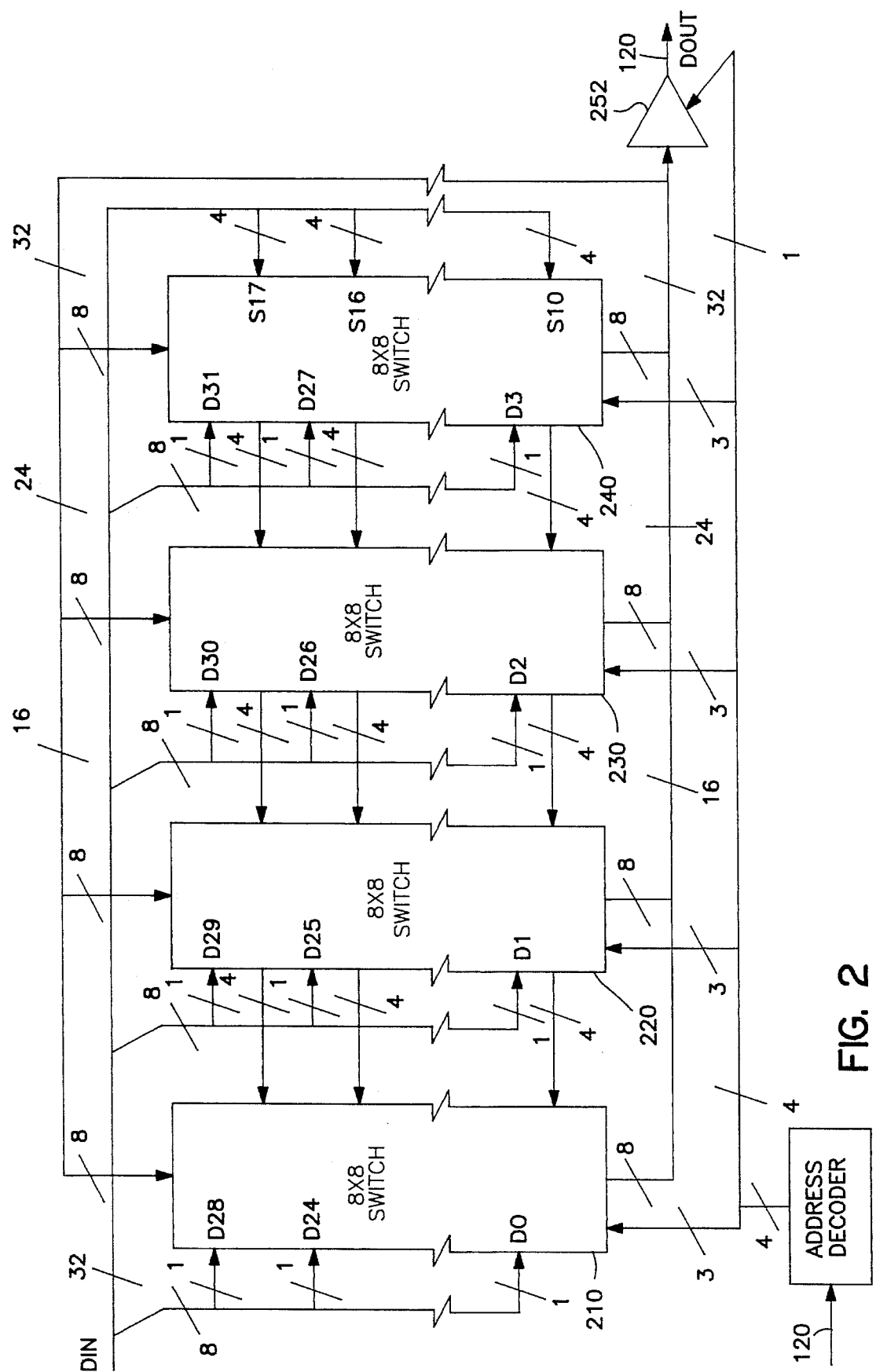
FIG. 2 is a block diagram of a bit-plane to pixel/pixel to bit-plane converter suitable for use in the display system shown in FIG. 1.

FIG. 2 is a block diagram of a bit-plane to pixel/pixel to bit-plane converter suitable for use as the converter 110 shown in FIG. 1. As shown in FIG. 2, the converter includes four eight-bit by eight-bit switches 210, 220, 230 and 240. Each of these switches is connected to receive eight-bits of input data from the input bus, DIN, on its left-hand side and to receive 32-bits of data on its right-hand side. In the case of switch 240 these 32-bits are the 32-bits of data from the input bus DIN. For the switches 210, 220 and 230, however, the data received at the right-hand port is from the respective next previous switch 220, 230 and 240 proceeding from right to left. Each of these switches provides an eight-bit output value to the output bus DOUT. In the exemplary embodiment of the invention the bus DOUT is also connected as an input bus to the switches 210, 220, 230 and 240.

The final input to the switches 210, 220, 230 and 240 is a four bit clock and control signal provided by address decoder 250. As shown in FIG. 2, the address decoder is coupled to the system bus 120 shown in FIG. 1. One bit of the four bit output signal provided by address decoder 250 is coupled to a three state buffer 252 which is used to selectively gate the output values of the four eight-by-eight switches 210, 220, 230 and 240 onto the system bus 120.

Although switch 240 is shown in FIG. 3, the illustrated switch is suitable for use as any one of the eight-by-eight switches 210, 220, 230 and 240 shown in FIG. 2. The exemplary switch includes eight rows of eight sequential logic elements. For the sake of brevity only three rows 310, 312, and 314 are shown in FIG. 3.

All of the individual logic elements 310a through 310h, 312a through 312h, and 314a through 314h are identical. Each logic element has four input terminals and one output terminal. An exemplary logic element is described below with reference to FIG. 4.

The R input terminal of each logic element is coupled to the Q output terminal of the device immediately above it in the matrix. When converted values are read out of the matrix via the Q output terminals of the bottom row of elements 314, data values representing the next word to be read from the converter are transferred down one level by enabling the R input terminals of the respective logic elements. As shown in FIG. 3, the output bus DOUT is coupled to the R input terminals of the top row of logic elements 310. Thus as a 32 bit output word is being read from the converter via the bus DOUT the same word is being written into the matrix of ray elements via the R input terminals of the logic elements 310a through 310h in the top row of the matrix of switch elements 240.

When the data values being converted are bit-plane representations of pixel images, they are stored into the matrix via the P input terminals of the left-most elements in each row. As shown in FIG. 3, the least significant bit, P31, of each 32 bit word is written into the P input terminal of element 310a. When operating in bit-plane to multi-bit pixel conversion mode, each of the elements 310a through 310h is coupled to store the value applied to the P input terminal and to simultaneously pass the previous output value, via the Q output terminal, to the P input terminal of the next element to the right. Thus, when the second 32 bit word from a bit-plane representation is applied to the converter, the least significant bit of the first word, which had been in element 310a, is shifted to element 310b while the least significant bit of the second word is written into element 310a.

This continues for each of the eight 32 bit words. If an image is represented by fewer than eight bit-planes, zero valued 32-bit words are provided to the converter 110 either by a literal store operation executed by the microprocessor 112 or by transferring the contents of a zero-valued 32-bit register (not shown) to the input port of the converter 110. Thus, at the end of the eight word cycle the row of elements 310a through 310h holds eight bits each representing a corresponding bit in the eight 32 bit words which represents the bit-plane image. As described above, each row of these bits in each eight-by-eight switch represents a single image pixel.

With reference to FIG. 2, as the least significant bit of the 32 bit input word is being applied input terminal D31 of switch 240, the other 31 bits of each word are being applied to other input terminals of each of the eight-by-eight switches 210, 220, 230 and 240. Each row of each switch corresponding to one of these input terminals holds a pixel of the converted image. As described above, these rows are read from the switches 210, 220, 230 and 240 one row at a time responsive to signals provided by the address decoder 250.

Referring to FIG. 3, the pixel values held in row 314 of the switch 240 and the pixel values held in the corresponding rows of the switches 210, 220 and 230 are read first followed by the pixel values in the next higher rows. The last two rows of pixel values to be read are in rows 312 and 310 of switch 240 and the corresponding rows of the switches 210, 220 and 230.

Referring to FIG. 3, when image data in multi-bit pixel format is to be converted to bit plane format, the 32 bits from the input bus DIN are applied to respectively different ones of the input terminals B0 through B31 shown on the right-hand side of FIG. 3. As described above, each eight consecutive bits of the 32 bit values applied in this mode represents a respectively different pixel. The object of the conversion process in this mode is to separate the bits of each of the 32 eight-bit pixels such that each bit occurs in a corresponding location in each of the eight 32-bit output words.

As shown in FIG. 3, bits 7, 15, 23 and 31 are applied to respective elements 310h, 310g, 310f and 310e of switch 240. During the next input cycle, when a new word is applied to the converter 110, bits 7, 15, 23 and 31 of the first word are shifted from logic elements 310e, 310f, 310g and 310h to logic elements 310a, 310b, 310c and 310d.

The shift occurs because, in this mode, the Q output terminal of each one of the elements 310a through 310h is connected to the C input terminal of a corresponding element which is to the left of the one element and separated from it by three intervening elements. This shifting operation continues as each of the eight 32-bit words, each containing four eight-bit pixel values, is written into the converter 110.

At the end of the input phase of the pixel-to-bit-plane conversion process, the bits representing individual pixels of the eight multi-bit pixel values are arranged in vertical columns. For example, assuming that the 32-bit input word is arranged with bit 31 being the most significant bit and bit 0 being the least significant bit, in the switch 240 shown in FIG. 3, column which includes logic elements 310a, 312a and 314a would contain the bits 31 through 24. The next image pixel would be contained in the column which includes the elements 310b, 312b and 314b. This bit would correspond to bits 23 through 16 of the multi-bit pixel input word.

In this orientation when the image matrix is read out a row at a time via the bus DOUT, the separate bits of each pixel have corresponding locations in each of the eight words that are read from the converter 110.

Figure 4:
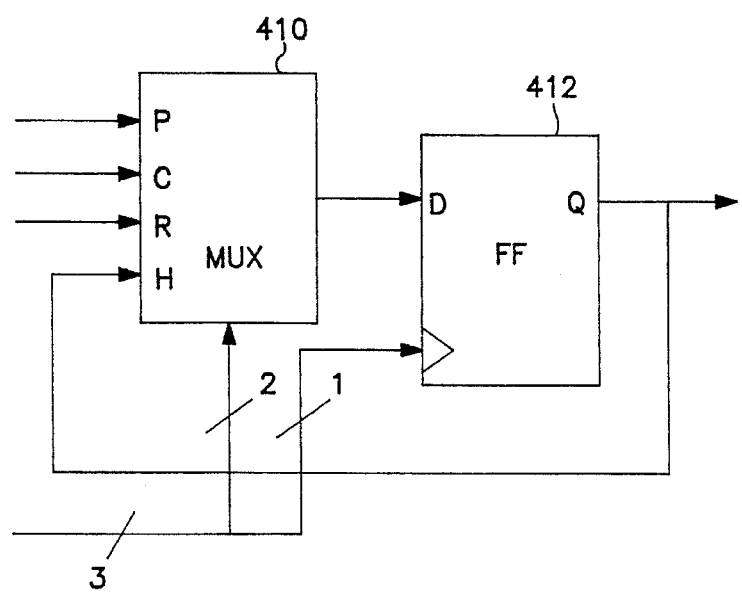
FIG. 4 is a block diagram of a sequential logic element suitable for use in the converter shown in FIGS. 1, 2 and 3.

FIG. 4 is a block diagram of circuitry suitable for use as one of the sequential logic elements of one of the switches 210, 220, 230 and 240. The element includes a four input multiplexer 410 and a D type flip-flop 412. The multiplexer 410 receives two bits of the four bit control signal at its control input terminal to select one of the four data input terminals P C R and H to provide to the input terminal D of the flip-flop 412. The input terminal H of the multiplexer 410 is coupled to the output terminal Q of the flip-flop 412. A third line of the control signal provided by the address decoder 250 is a system clock signal which is applied to the clock input terminal of the flip-flop 412.

When no conversion operation is taking place, the control value applied to the multiplexer 410 couples the output terminal Q of the flip-flop 412 to the input terminal D of the flip-flop 412 through the terminal H of the multiplexer 410. In this mode, each storage element continually recirculates its stored value.

When the address value being written into by the microprocessor 412 indicates a bit-plane to multi-bit pixel conversion format, the two bit signal applied to the multiplexer 410 by the address decoder 250 gates the signal on the input terminal P as the signal which is applied to the input terminal D of the flip-flop 412. Similarly, when the address being written into by the microprocessor 112 indicates a multi-bit pixel to bit-plane conversion, the multiplexer 410 is conditioned to gate the input signal applied to its input terminal C to the input terminal D of the flip-flop 412.

Finally, when the address value that is being read by the microprocessor 112 indicates a read operation from the converter 110, the input signal R is gated through the multiplexer 410 to the flip-flop 412. This same combination of bits is coupled to the enable input of the three state gate 252, shown in FIG. 2. As described above, this gate allows the output signal of the converter 110 to be placed on the system bus 120.

In the exemplary embodiment of the invention, only two memory-mapped locations are used by the converter 110. When a write operation is executed to the first location, the address decoder 250, shown in FIG. 2, interprets the write operation as a request to convert bit-plane data to multi-bit pixel data. A write operation to the second location causes the address decoder 250 to condition the controller to receive multi-bit pixel data which is to be converted into bit-plane data. A read operation from the first memory location provides the converted data to the system bus 120 (shown in FIG. 1) for either conversion process.

While the invention has been described in terms of an exemplary embodiment, it is contemplated that it may be practiced as outlined above within the spirit and scope of the appended claims.

The invention claimed is:

1. Apparatus for converting image data between a bit-plane format and a differently formatted multi-bit pixel format comprising:

a matrix of sequential logic elements arranged as a matrix having M rows and N columns, where M and N are integers, each sequential logic element including means for storing a one-bit digital value;

input means for receiving sequential data values representing the image data having one of the bit-plane format and the differently formatted multi-bit pixel format;

data routing means, coupled to the input means, for storing the received data in the logic elements on the columns of the matrix, wherein the sequential data values are stored in first and second predetermined sequences for the bit-plane data and the differently formatted multi-bit pixel data, respectively; and means for reading, from the logic elements on the columns of the matrix, sequential data values to produce converted image data having one of the bit-plane format and the differently formatted multi-bit pixel format which is different from the format of the received data.

2. Apparatus according to claim 1, wherein:

each of the differently formatted multi-bit pixel values includes M-bits where N divided by M (N/M) is an integer; and the routing means includes means for directing each bit of one of the differently formatted multi-bit pixel input data values to a respectively different row of the matrix along a single column.

3. Apparatus according to claim 1, wherein:

each of the differently formatted multi-bit pixel values includes M-bits where N divided by M is an integer; and the routing means includes means for directing a first bit of one of the bit-plane input data values to a first one of the logic elements and for directing a next subsequent bit of the one bit-plane input data value to a second one of the logic elements, said second logic element being in the same row of the matrix as the first logic element but being separated from the first logic element by N/M−1 intervening logic elements.

4. An apparatus for converting image data between a bit-plane format and a differently formatted multi-bit pixel format comprising:

a matrix of sequential logic elements arranged as a matrix having M rows and N columns, where M and N are integers, each sequential logic element including means for storing a one-bit digital value;

input means for receiving sequential data values representing the image data having one of the bit-plane format and the differently formatted multi-bit pixel format, the input means having means for receiving M sequential data words, representing N multi-bit pixel values, each one of the multi-bit pixel values having M-bits where N divided by M (N/M) is an integer;

data routing means, coupled to the input means, for storing the received data in the logic elements on the columns of the matrix, wherein the sequential data values are stored in first and second predetermined sequences for bit-plane data and multi-bit pixel data, respectively, the data routing means comprising:

(a) means for separating each of the M sequential data words into N/M portions and for storing each of the separated portions along a respectively different one of a first predetermined N/M columns of the matrix, and (b) means for shifting the portions stored in the first N/M columns of the matrix, in response to a first one of the input data words, to a second predetermined N/M columns of the matrix, different from the first N/M columns, in response to receiving a second one of the input data words, and means for reading, from the logic elements on the columns of the matrix, sequential data values to produce converted image data having one of the bit-plane format and the differently formatted multi-bit pixel format which is different from the format of the received data.

5. Apparatus for converting image data between a bit-plane format and a multi-bit pixel format comprising:

a matrix of sequential logic elements arranged as a matrix having M rows and N columns, where M and N are integers, each sequential logic element including means for storing a one-bit digital value, and the matrix of sequential logic elements is divided into N/M sub-matrices of logic elements, each containing M rows and M columns;

input means for receiving sequential data values representing the image data, the input means comprising:

(a) means for receiving M sequential data words, representing N multi-bit pixel values, (b) means for receiving M sequential data words, representing N image pixels in bit-plane format;

data routing means, coupled to the input means for storing the received data in the logic elements on the columns of the matrix, wherein the sequential data values are stored in first and second predetermined sequences for bit-plane data and multi-bit pixel data, respectively, each multi-bit pixel value includes M-bits where N divided by M (N/M) is an integer, the data routing means comprising:

(a) means for separating each of the M sequential data words into N/M portions and for storing each of the separated portions along a respectively different one of a first predetermined N/M columns of the matrix, (b) means for shifting the portions stored in the first N/M columns of the matrix, in response to a first one of the input data words, to a second predetermined N/M columns of the matrix, different from the first N/M columns, in response to receiving a second one of the input data words, (c) means for directing each bit-value of a received data word to a respectively different one of a first group of N predetermined logic cells, wherein each of the predetermined logic cells is in a first respective column of each of the respective sub-matrices, and (d) means for shifting the bit-values stored in the first group of N predetermined logic cells which are stored in response to a first one of the input data words, to a second group of N predetermined logic cells, wherein each of the second group of N predetermined logic cells is in a second respective column of each of the sub-matrices, different from the first column; and means for reading, from the logic elements on the columns of the matrix, sequential data values representing the converted image data.

6. The apparatus set forth in claim 5 where N is 32 and M is 8.

7. The apparatus set forth in claim 6 wherein:

he input means includes:

means, responsive to a memory store request to a first memory location, for causing the routing means to route the input data as bit-plane data;

means responsive to a memory store request to a second memory location, for causing the routing means to route the input data as multi-bit pixel data; and means responsive to a memory fetch request from one of the first and second memory locations for reading the sequential data values representing the converted image data from the columns of the matrix.

* * * * *